(12) United States Patent
Al-Azzawi

(10) Patent No.: US 8,967,274 B2
(45) Date of Patent: Mar. 3, 2015

(54) SELF-PRIMING PUMP

(76) Inventor: Jasim Saleh Al-Azzawi, Dubai (AE)

( * ) Notice: Subject to any disclaimer, the term of this patent is extended or adjusted under 35 U.S.C. 154(b) by 341 days.

(21) Appl. No.: 13/536,446

(22) Filed: Jun. 28, 2012

(65) Prior Publication Data

US 2013/0104596 A1    May 2, 2013

(51) Int. Cl.
*E21B 43/00* (2006.01)
*E21B 43/16* (2006.01)
*F04D 9/00* (2006.01)
*F04F 99/00* (2009.01)
*E21B 36/00* (2006.01)
*E21B 43/243* (2006.01)
*F16K 5/00* (2006.01)

(52) U.S. Cl.
CPC .............. *E21B 36/00* (2013.01); *E21B 43/243* (2013.01); *F16K 5/00* (2013.01)
USPC ........... 166/369; 166/401; 417/200; 417/102; 417/103

(58) Field of Classification Search
CPC .............. F04D 9/002; F04D 9/02; F16K 5/00
USPC ................... 166/369, 401; 417/200, 101–103
See application file for complete search history.

(56) References Cited

U.S. PATENT DOCUMENTS

| 905,211 | A | * | 12/1908 | Moore | 417/102 |
|---|---|---|---|---|---|
| 1,011,226 | A | * | 12/1911 | Miller | 417/102 |
| 1,690,254 | A | * | 11/1928 | Skidmore, Jr. | 417/102 |
| 1,902,961 | A | * | 3/1933 | La Bour | 417/54 |
| 1,995,812 | A | * | 3/1935 | Noble | 417/200 |
| 2,057,570 | A | * | 10/1936 | Haentjens | 417/89 |
| 2,071,703 | A | * | 2/1937 | Chambers, Jr. et al. | 417/200 |
| 2,162,247 | A | * | 6/1939 | Dean et al. | 417/83 |
| 2,275,500 | A | * | 3/1942 | Broadhurst | 417/80 |
| 2,275,501 | A | * | 3/1942 | Broadhurst | 417/89 |
| 2,275,502 | A | * | 3/1942 | Broadhurst | 417/80 |
| 2,486,288 | A | * | 10/1949 | Jacuzzi et al. | 417/80 |
| 2,549,620 | A | * | 4/1951 | Mitchell | 417/102 |
| 2,665,551 | A | * | 1/1954 | Chenault | 60/414 |
| 2,704,034 | A | * | 3/1955 | Jones | 417/102 |
| 2,883,936 | A | * | 4/1959 | Daddario | 417/80 |
| 3,081,598 | A | * | 3/1963 | Goodwin | 60/328 |
| 3,222,865 | A | * | 12/1965 | Miller | 60/327 |
| 3,229,639 | A | * | 1/1966 | Hignutt et al. | 417/6 |
| 3,250,326 | A | * | 5/1966 | Witherspoon | 166/250.03 |
| 3,363,516 | A | * | 1/1968 | Hubbard | 91/519 |
| 3,602,612 | A | * | 8/1971 | Osdor | 417/102 |
| 3,937,280 | A | * | 2/1976 | Dinning | 166/321 |
| 4,067,663 | A | * | 1/1978 | Brooks et al. | 417/199.2 |
| 4,711,306 | A | * | 12/1987 | Bobo | 166/372 |
| 5,073,090 | A | * | 12/1991 | Cassidy | 417/102 |
| 5,147,530 | A | * | 9/1992 | Chandler et al. | 210/90 |

(Continued)

*Primary Examiner* — Jennifer H Gay
(74) *Attorney, Agent, or Firm* — Moore Patents; David Dreyfuss; Cynthia R. Moore

(57) ABSTRACT

A pumping system is disclosed comprising a supply pipe, a delivery pipe, a pump capable of pumping a liquid, a first tank with a top port and a bottom port, a second tank with top port and a bottom port, a first pipe switcher operable to switch connections the supply/delivery pipes and the top ports, and a second pipe switcher operable to switch connections between the bottom ports and the pump inlet/outlet. The pipe switchers serve to switch input and output connections such that the tanks are swapped from a position between the supply pipe and the pump inlet and a position between the pump outlet and the delivery pipe. Uses for cooling systems, air compressors, deep wells, and oil extraction are also disclosed.

15 Claims, 17 Drawing Sheets

(56) References Cited

U.S. PATENT DOCUMENTS

| | | | |
|---|---|---|---|
| 5,488,993 A * | 2/1996 | Hershberger | 166/372 |
| 5,536,147 A * | 7/1996 | Lang | 417/199.2 |
| 6,209,641 B1 * | 4/2001 | Stevenson | 166/266 |
| 6,454,002 B1 * | 9/2002 | Stokes et al. | 166/250.15 |
| 6,682,313 B1 * | 1/2004 | Sulmone | 417/199.2 |
| 7,686,086 B2 * | 3/2010 | Brammer | 166/357 |
| 2001/0035215 A1 * | 11/2001 | Tipton et al. | 137/571 |
| 2002/0007953 A1 * | 1/2002 | Liknes | 166/372 |
| 2003/0039554 A1 * | 2/2003 | Krasnov | 417/103 |
| 2003/0056824 A1 * | 3/2003 | Harvey | 137/265 |
| 2011/0017456 A1 * | 1/2011 | Koide et al. | 166/305.1 |
| 2011/0048548 A1 * | 3/2011 | Rahm | 137/351 |
| 2013/0104596 A1 * | 5/2013 | Al-Azzawi | 62/606 |

* cited by examiner

SELF-PRIMING PUMP

FIELD OF THE INVENTION

One or more embodiments of the present invention relate to self-priming pumps.

BACKGROUND

When air goes into a centrifugal pump, it can cause the pump to stop pumping water, because the centrifugal impeller cannot efficiently pump air and suck water from a supply pipe. If the water source is far away from the pump, it cannot efficiently pump water until the entire length of the source pipe is filled with water. A pump full of air may not be able to generate enough pressure difference to draw water into the pump. If some air bubbles are present in the long pipe, these air bubbles can combine to form an air pocket which can stop the pumping of water. Therefore it is common practice to position centrifugal pumps close to the water source (e.g., a river or lake). In the case of wells, the pump is positioned at the bottom of the well to make the distance between the centrifugal pump and the water source as short as possible.

There is also a risk, when putting an expensive diesel powered centrifugal pump a mile or more away from a house or farm, that the pump can be stolen at night. If the pump is electric, a long cable would be needed extending from the house to the water source. The cable installation can be expensive, and it, too can be stolen. Further, if maintenance is required, it may be necessary to travel a long way, perhaps in the middle of the night, to correct a simple problem, for example with fuel supply to the diesel engine.

Even with a pump positioned close to the water source, a "priming" operation is often required. In many pumps, this process is achieved manually by pouring liquid into the pump through a priming port. If there is a lot of air that must be purged from the supply line, either enough water must be added to completely fill the supply line, or the priming operation may need to be repeated several times until all of the air is pumped out of the supply line. Typically, a small amount of air can be "pumped" by entraining it into pumped water, but larger amounts can fill the pump with air again and cause it to stop pumping. "Self-priming" pump designs are also known, whereby the priming operation is automated in some way. For example, in some installations, it may be possible to position the pump below the water level (either literally submersed, or adjacent to the water supply but at a level below the water surface). In these installations, gravity can provide the force required to keep the pump primed, even if the supply pipe is leaky, and the pump provides the additional force required to pump water to a higher elevation and/or a distant location.

SUMMARY OF THE INVENTION

A pumping system is disclosed comprising a supply pipe; a delivery pipe; a pump capable of pumping a liquid; a first tank with a first top port and a first bottom port; a second tank with second top port and a second bottom port; a first pipe switcher operable to switch connections between a first state and a second state, wherein the first state comprises a connection between the supply pipe and the first top port and a connection between the delivery pipe and the second top port, and wherein the second state comprises a connection between the supply pipe and the second top port and a connection between the delivery pipe and the first top port; and a second pipe switcher operable to switch connections between the a first state and a second state, wherein the first state comprises a connection between the first bottom port and the pump inlet and a connection between the second bottom port and the pump outlet, and wherein the second state comprises a connection between the first bottom port and the pump outlet and a connection between the second bottom port and the pump inlet. The first state of the first pipe switcher is contemporaneous with the first state of the second pipe switcher, and the second state of the first pipe switcher is contemporaneous with the second state of the second pipe switcher.

The first and second pipe switchers can each comprise two normally open valves and two normally closed valves connected to a common actuator. The common actuator can comprise a solenoid and spring. The common actuator can be a bistable actuator.

The first and second pipe switchers can each comprise a unitary valve body with four ports, and can be combined into a single unitary body with a common actuator.

Sufficient fluid is initially present to fill the pump and the second pipe switcher and to substantially fill one of the two tanks. At least one level sensor in each tank can be provided. A control system can monitor the level sensors and change the state of the switching valves such that the pump is always substantially full of fluid, even if the supply pipe is empty of fluid.

A cooling system is disclosed comprising the above pumping system. The supply pipe is connected to the output of the evaporator of the cooling system, and the delivery pipe is connected to the input of the condenser of the cooling system.

A gas compression system is also disclosed comprising the above pumping system. The supply pipe is connected to the source of gas to be compressed, and the delivery pipe provides compressed gas for use or storage.

A system for pumping water from an underground reservoir is also disclosed comprising the gas compression system. The delivery pipe is connected to a first well pipe going down into the underground reservoir and water is pushed up through a second well pipe to the surface.

A system for extracting oil is also disclosed. The gas compression system is used to pump oxygen into an oil reservoir, and underground combustion is used to drive heated oil to the surface. Optionally, a second pumping system can be used to pump a combustible fuel into the oil reservoir.

A method for pumping water from an underground reservoir is disclosed comprising pumping gas through a first well pipe into the underground reservoir using the above pumping system and pushing water up through a second well pipe to the surface.

A method of heating an underground oil reservoir is disclosed comprising pumping oxygen into the underground oil reservoir using the above pumping system and causing combustion to take place in the underground oil reservoir. Optionally, a combustible gas or liquid is also pumped into the oil reservoir using a second pumping system. The heated oil can be pushed through a well pipe to the surface.

DETAILED DESCRIPTION

Figure 1:
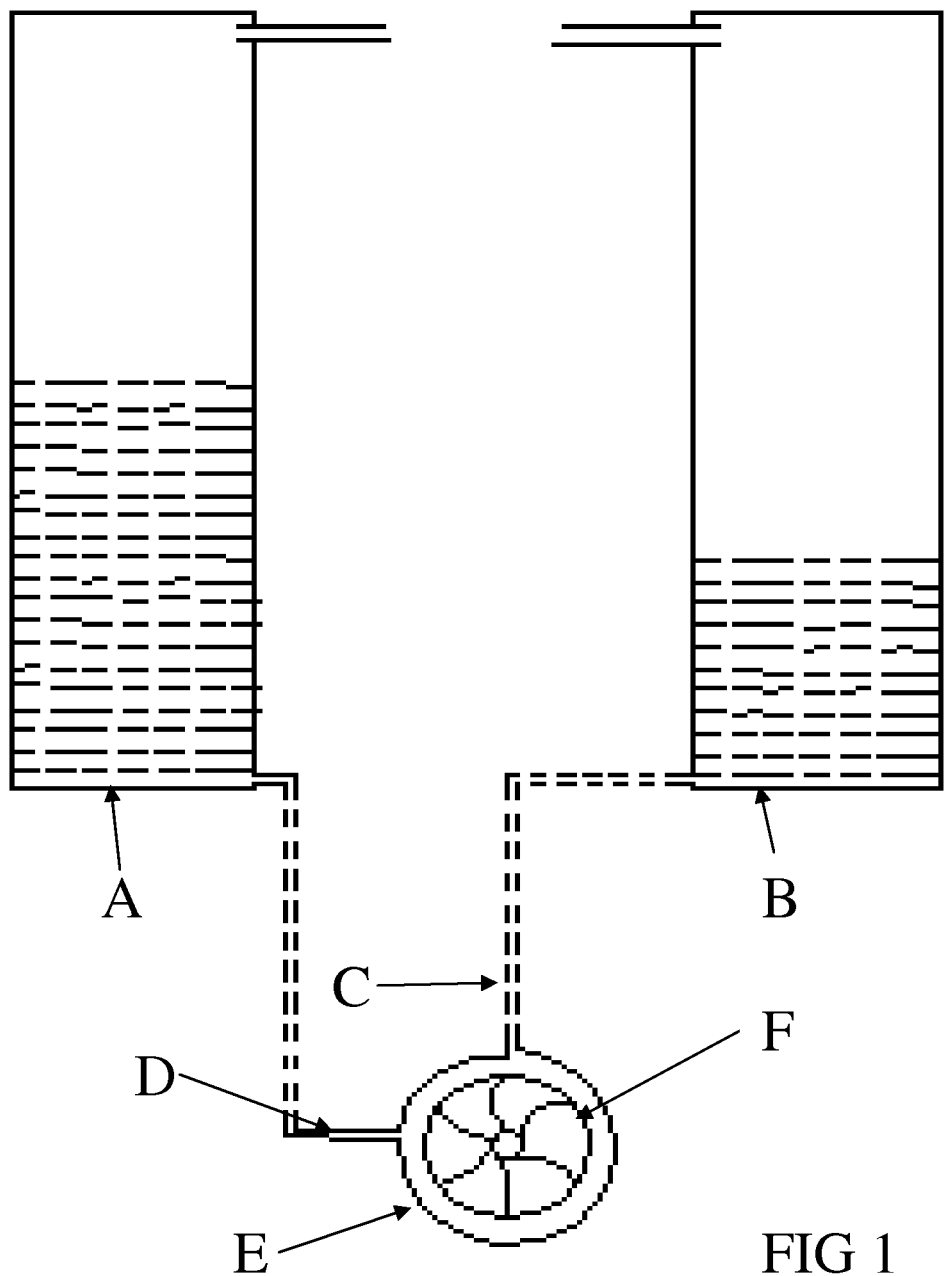
FIG. 1 shows the two tanks and a centrifugal pump.

It must be noted that as used herein and in the claims, the singular forms "a," and "the" include plural referents unless the context clearly dictates otherwise. Thus, for example, reference to "a valve" includes two or more valves, and so forth. Embodiments are frequently described for centrifugal pumps pumping water, although it is understood that the priming methods and devices disclosed herein apply to any pump technology requiring priming, and to the pumping of any liquid.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. The terms "about" and "approximately" generally refers to ±10% of a stated value.

DEFINITIONS

As used herein, the term "centrifugal pump" refers to a pump having a rotating impeller which increases the pressure of a liquid at the outer rotating edge relative to the axis. Typically, an inlet is mounted near the axis, and an outlet is mounted near the outer edge of the impeller. The pressure difference can then be used to pump fluid from the inlet to the outlet.

As used herein the term "magic pipe switcher" refers to a valve assembly with two inlets and two outlets, wherein the first inlet can be connected to one of the two outlets and the second inlet can be connected to the other outlet, and the connections are swapped when the valve position is changed by a suitable actuator.

The present invention solves problems related to pump priming by adding two tanks and two "magic" pipe switchers so that a pump can draw air for as long as necessary until liquid arrives, and if the liquid is mixed with some air, for example, due to air leakage in the supply pipe, the pump can pump liquid as if there were no air present. The pump can be situated anywhere convenient to the user.

There is one well-known limitation to pump positioning that applies to all liquid pumps, whether they require priming or not: it is not possible to position a pump at a height above a water source that exceeds a one atmosphere "head." For example, when pumping fresh water at sea level, a column of water 34 ft (10.4 m) high has a pressure at the bottom of one standard atmosphere more than the pressure at the top of the column. Thus, if you try to pump water from a source located more than 34 ft below the pump, the best you can do is to draw the water up to a height of 34 ft above its natural level. At that point, you will have drawn all of the air out of the supply tube, and there will be a vacuum in the pipe above that level. No pump can produce any force on the column of water by "sucking" further on a vacuum. Therefore, any self-priming pump must be positioned no higher than the height of a column of liquid corresponding to one local atmosphere of head pressure.

The present invention also enables new generations of cooling systems and air compressor systems, employing the same magic pipe switchers to keep the pump primed.

Referring to FIG. 1, in embodiments of the present invention, the input of a centrifugal pump E with impeller F is always connected to a tank (either A or B) containing water, so the centrifugal pump E always receives water and can always pump water. In order to ensure that there is always an available tank containing water, two tanks A and B are provided, and a magic pipe switcher swaps which tank is connected to the pump input in a way that an empty tank is never connected to the input as set forth below. The pump never stops pumping, because it is always provided with water to pump.

Figure 2:
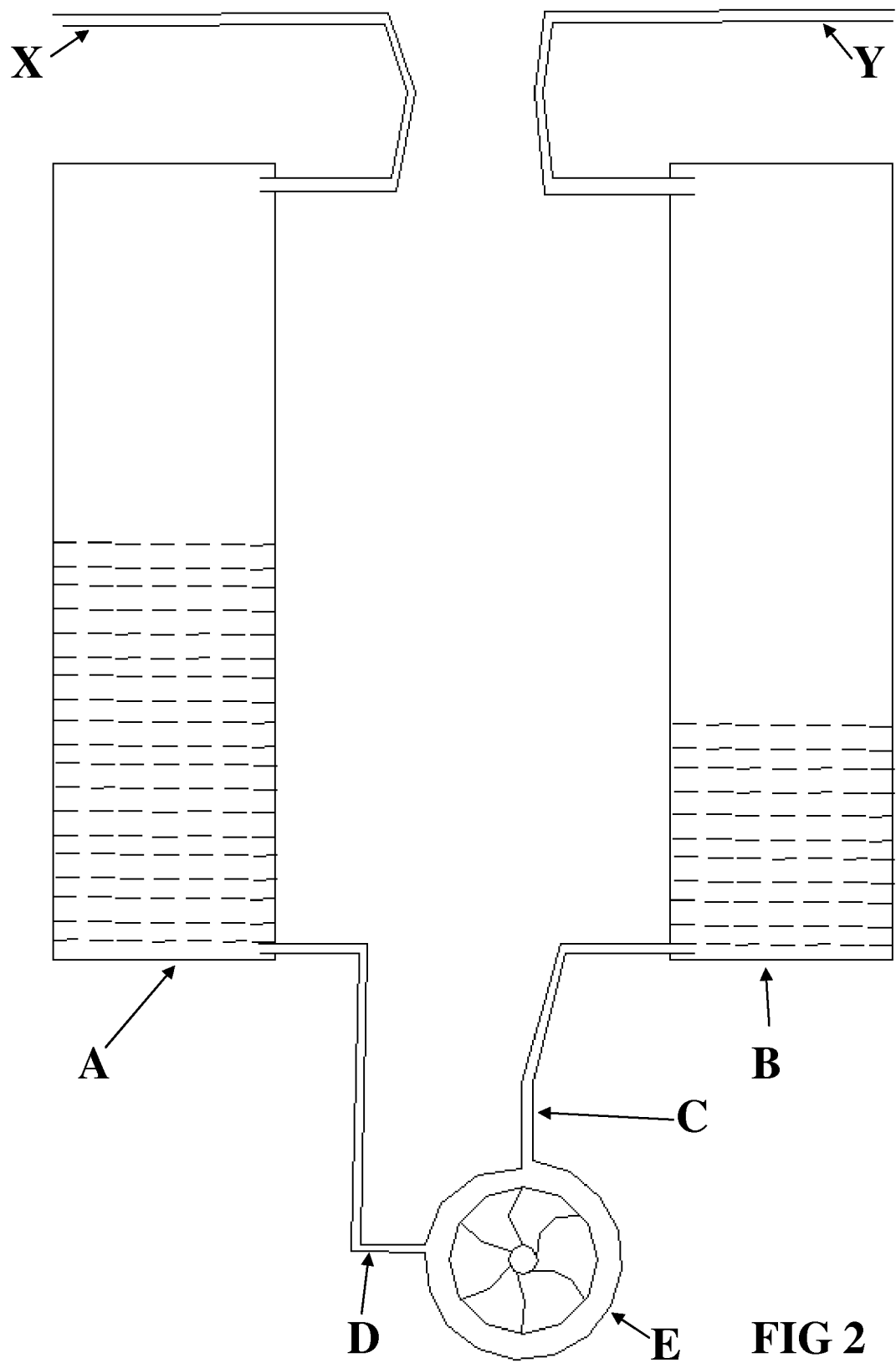
FIG. 2 shows the centrifugal pump connected between the tank bottoms with supply and delivery pipes connected to the tank tops.

Referring to FIG. 2, the centrifugal pump E is shown sucking water from tank A into pump inlet D and pumping it out through pump outlet C into tank B. Assume that tank A starts out nearly full of water. Tank A is connected to supply pipe X and tank B is connected to delivery pipe Y. If there is no air in the system, then the tanks have no particular function and the water is pumped from supply pipe X to delivery pipe Y.

Figure 3:
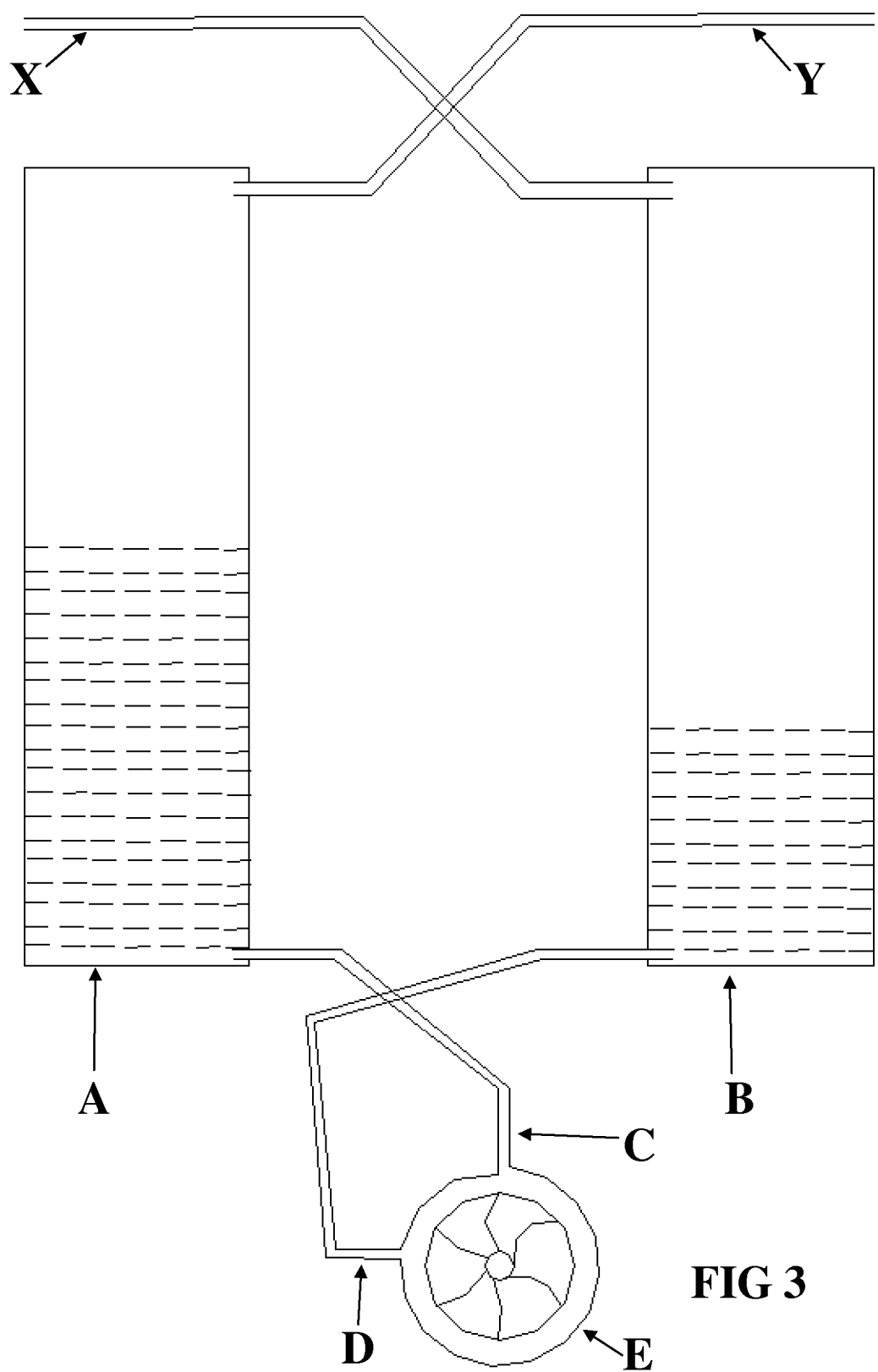
FIG. 3 shows the same tanks and pump with the supply and delivery pipes swapped and the connections to the pump swapped.

If air is present in the supply line, it will tend to collect in tank A, and the liquid level in the tank will gradually decrease. When tank A is almost empty, even if no water has yet arrived via supply pipe X, tank B will be almost full from the water originally in tank A. Now the "magic" switching occurs, and the pipe connections are changed from the arrangement shown in FIG. 2 to the arrangement shown in FIG. 3. Both pump connections and supply connections are reversed. Pump inlet D is connected to tank B, and pump outlet C is connected to tank A Supply pipe X is connected to tank B, and delivery pipe Y is connected to tank A. Water is still pumped from supply pipe X to delivery pipe Y, but the tanks are reversed so that tank B is now connected on the input side between supply pipe X and pump inlet D, while tank A is now connected on the output side between pump outlet C and delivery pipe Y.

Figure 4:
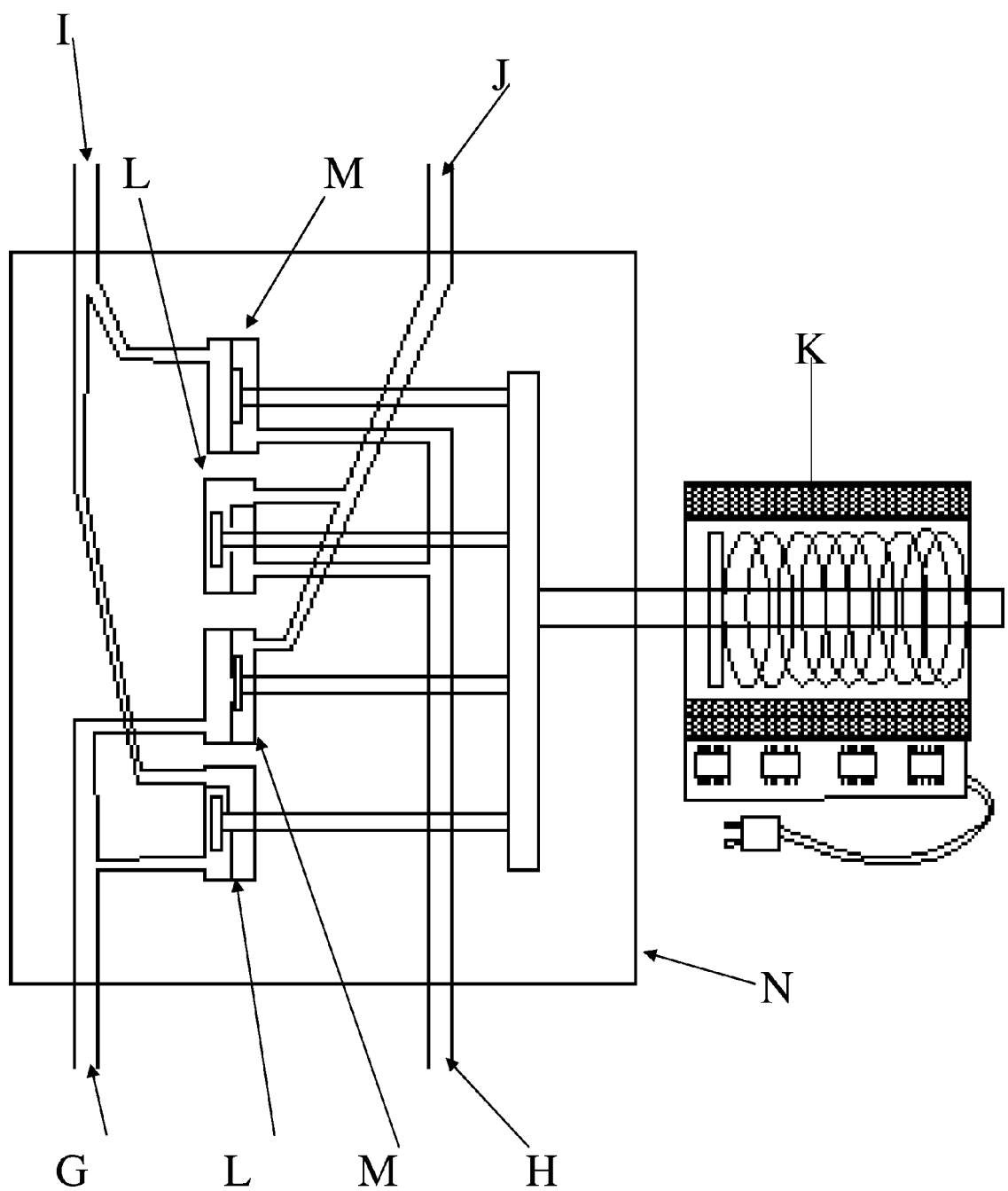
FIG. 4 shows a "magic pipe switcher" capable of making the pipe switches between the state shown in FIG. 2 and the state shown in FIG. 3.
Figure 5:
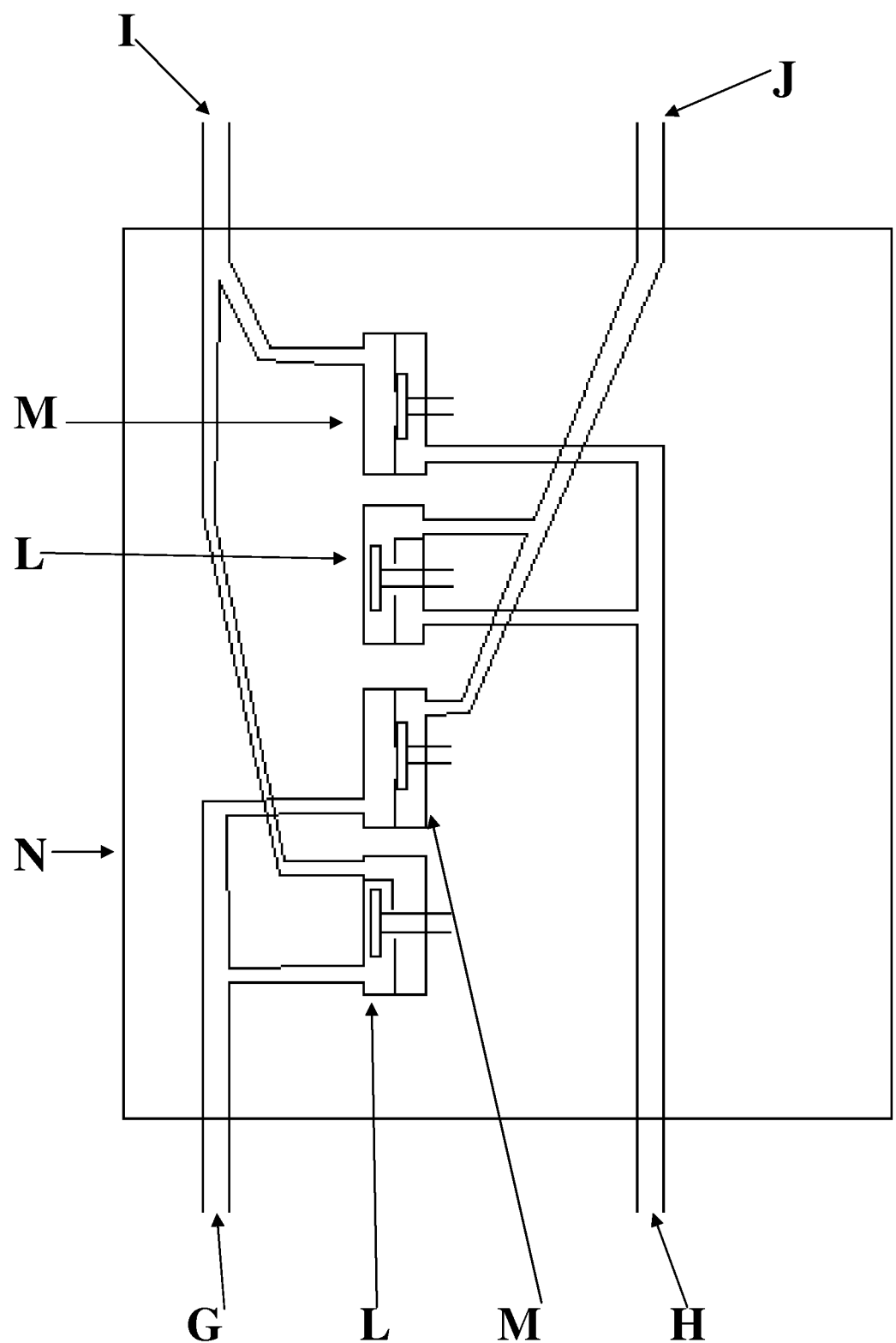
FIG. 5 shows details of the pipe connections for a magic pipe switcher.
Figure 6:
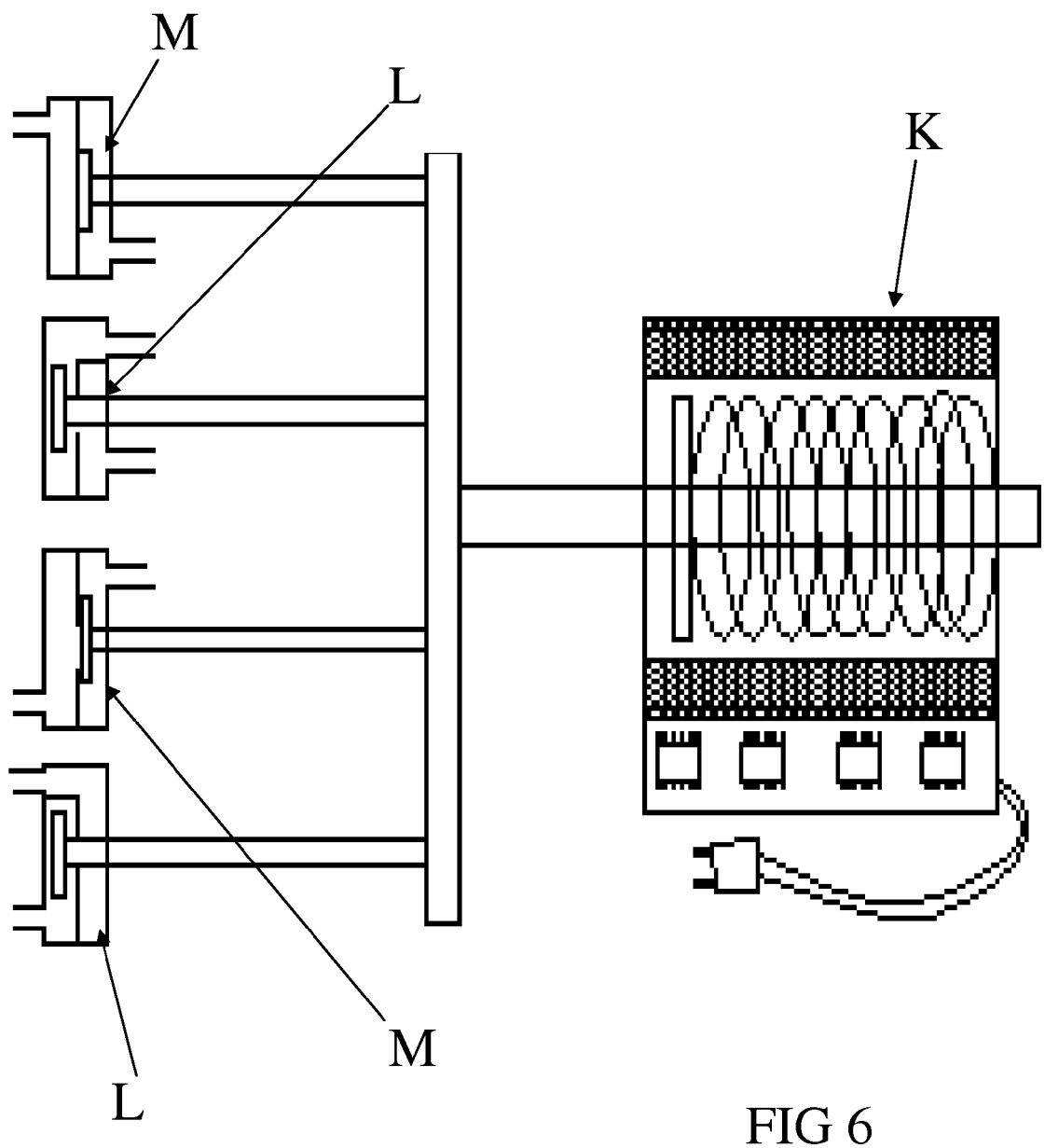
FIG. 6 shows the pipe switcher valves connected to an actuator.
Figure 7:
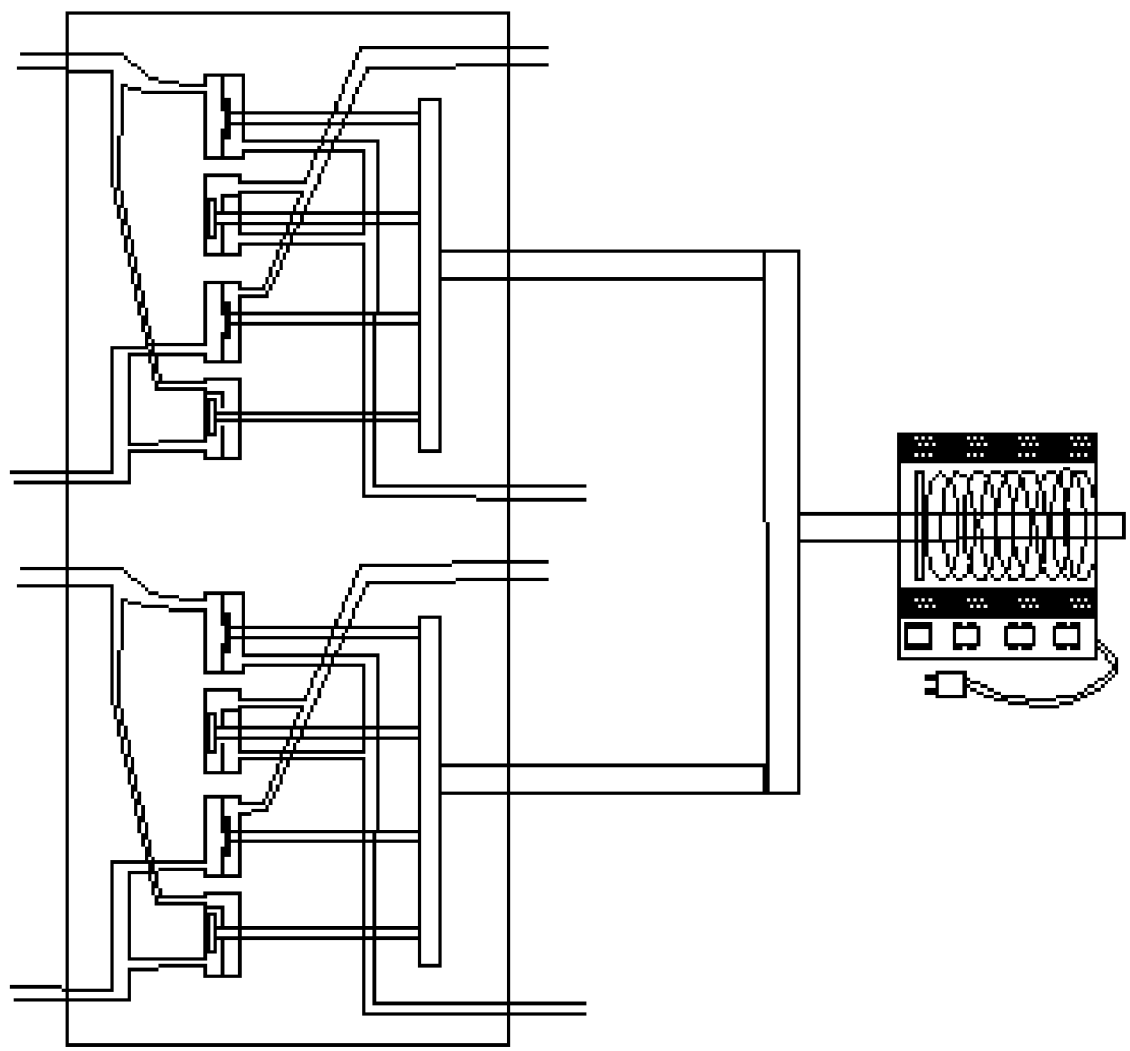
FIG. 7 shows details of the normally open and normally closed valves in their "normal" position.
Figure 8:
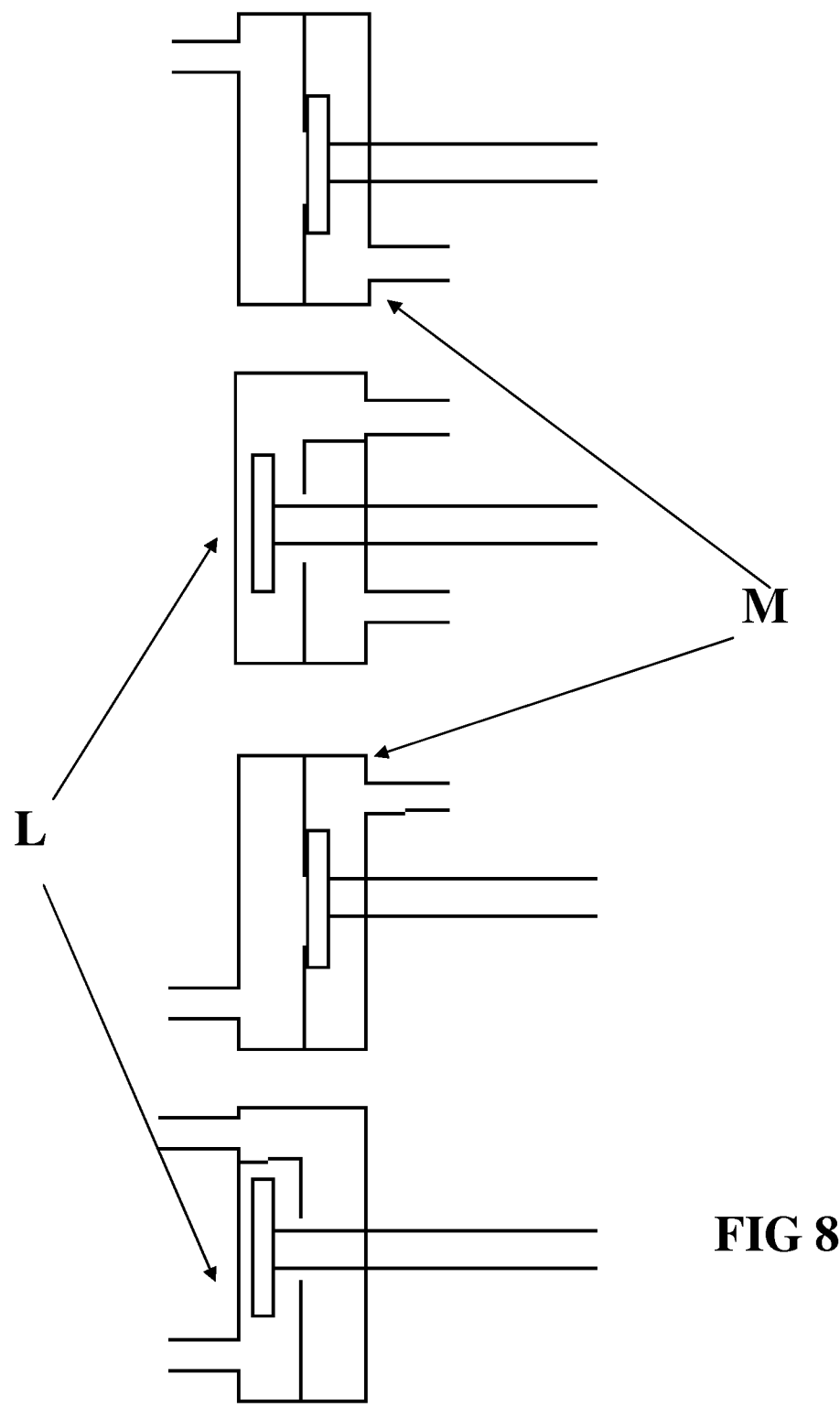
FIG. 8 shows the full set of four valves to make a magic pipe switcher.

The switching function can be provided by the embodiment of a "magic pipe switcher" shown in FIGS. 4-8. FIG. 4 shows the complete assembly; FIG. 5 omits the valve actuator, so that the fluid flow paths can be seen more clearly; FIG. 6 shows just the valve actuator and valves, FIG. 7 shows two magic pipe switchers in a unitary body driven by a single actuator, and FIG. 8 shows just the four valves. All figures show the same components in the same relative arrangement with reference letters referring to the same parts in each figure.) A magic pipe switcher N comprises four valves. Two valves L are normally open and two valves M are normally closed. A strong spring and solenoid K are in opposition to control the motion of the valves. When the solenoid K is activated, it pulls against the spring and opens the normally closed valves M and simultaneously closes the normally opened valves L. There are four ports. Port G is always an input, port H is always an output, while ports I and J swap between input and output functions according to whether the solenoid K is activated or released. In the "normal" position with solenoid K released, port G is connected to port I, and port J is connected to port H. In the "active" position with solenoid K activated, port G is connected to port J, and port I is connected to port H.

Figure 9:
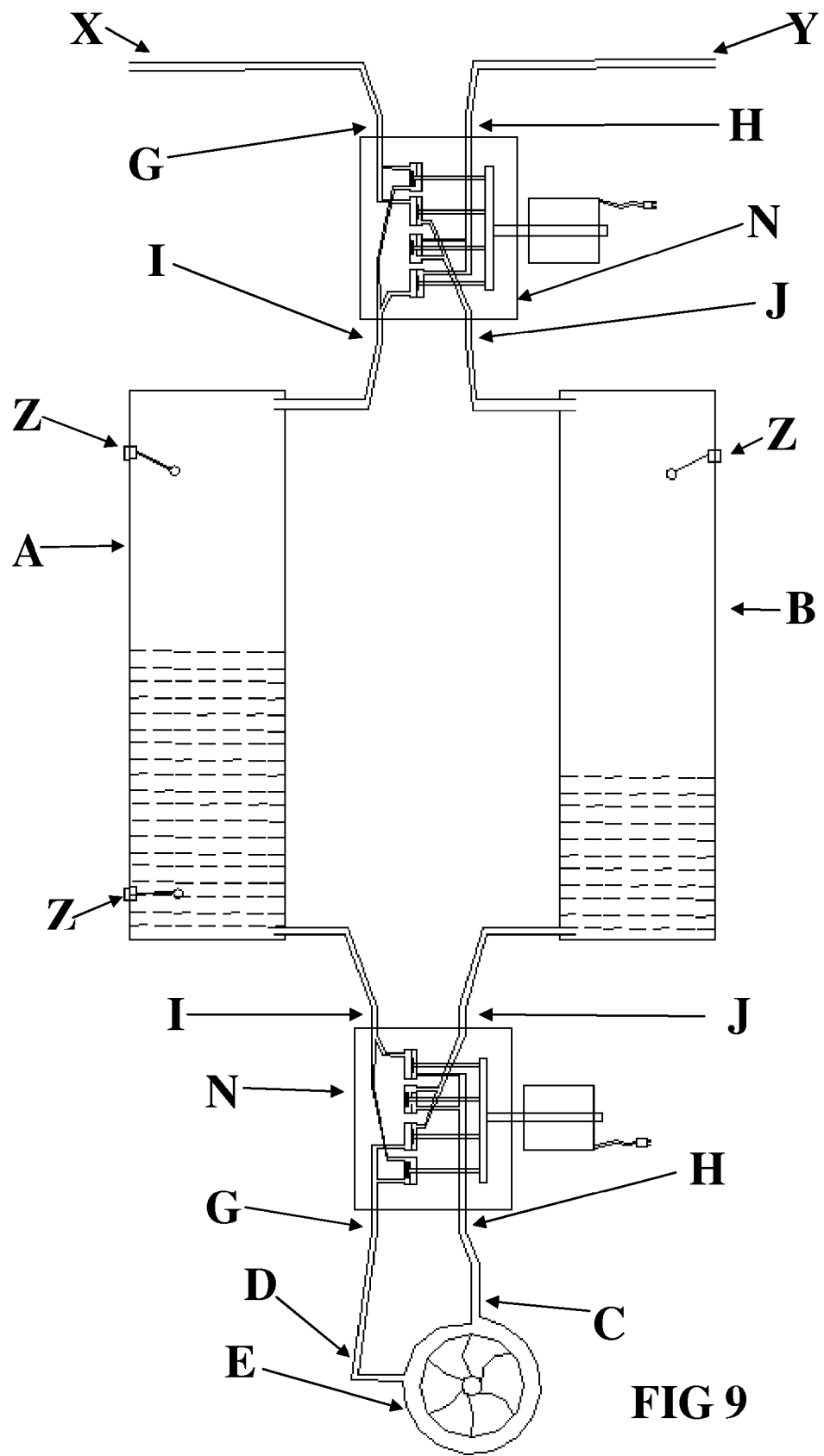
FIG. 9 shows a complete pumping system with two magic pipe switcher and two tanks.

FIG. 9 shows an embodiment of a complete system comprising a centrifugal pump E, two tanks A and B, and two magic pipe switchers N, the supply pipe X, and the delivery pipe Y. This assembly implements the tank and supply switching functions described above. When the solenoids are released, supply pipe X is connected to tank A, and tank A is connected to pump inlet D, while pump outlet C is connected to tank B, and tank B is connected to delivery pipe Y. When the solenoids are activated, supply pipe X is connected to tank B, and tank B is connected to pump inlet D, while pump outlet C is connected to tank A, and tank A is connected to delivery pipe Y.

In some embodiments, tanks A and B further comprise level sensors. Various sensor types and locations can be used. In some embodiments, the sensors sense presence or absence of water. A two-sensor configuration can be used with sensors near the top of each tank. Each sensor is protected from splashing so that it detects water level in the tank and not local turbulent flow. Starting with tank A mostly full of water and the solenoids released, water is pumped from tank A to tank B, displacing the air of tank B. The water level in Tank B goes up, and air is pushed out. Tank A is refilled from supply pipe X which may contain air, water, or a mixture of air and water. The air in tank B is pushed into delivery pipe Y. Initially, the sensor at the top of tank A may sense the presence of water, but the sensor at the top of tank B does not sense the presence of water. As pumping proceeds, if there is air in the supply pipe X, then at some point, neither sensor will detect the presence of water.

After a time, as the liquid level rises in tank B, and its sensor will sense the presence of liquid. If the sensor at the top of tank A does not sense the presence of liquid (i.e., B and (not A)), a control system activates the solenoids K for both magic pipe switchers. The role of tanks A and B are now reversed. The pump now pumps water from tank B which is full of water into tank A. But since tank B is connected to supply pipe X and tank A is connected to delivery pipe Y, the pump is still is pumping from supply pipe X to delivery pipe Y.

When the sensor at the top of tank A senses the presence of liquid, but the sensor at the top of tank B does not sense the presence of liquid (i.e., A and (not B)), the control system releases the solenoids K for both magic pipe switchers. The pump resumes water from tank A which is full of water into tank B. The pump is still is pumping from supply pipe X to delivery pipe Y.

These two states can alternate until all air is removed from supply pipe X and Tank A. When all air is removed, the sensors at the top of both tanks sense the presence of liquid (i.e., A and B) and the control system does switch the state of the magic pipe switchers.

In the two-sensor embodiment just described, the alternation of states can end with the solenoids either activated or released. The complete logic is given in Table 1. (Note that "unchanged" means that when the indicated state is reached, the solenoid is maintained in the previous state.)

TABLE 1

| Water at top of tank A | Water at top of tank B | Solenoid state |
| --- | --- | --- |
| absent | absent | unchanged |
| absent | present | activated |
| present | absent | released |
| present | present | unchanged |

In some embodiments, it is desirable to ensure that the fully primed pump state which can be maintained for extended periods of time occurs with the solenoids released. One way to ensure that the solenoids are always released when the pumps are fully primed is to break the logic symmetry by always releasing the solenoid whenever the sensor at the top of tank A senses the presence of water. The resulting logic is given in Table 2.

TABLE 2

| Water at top of tank A | Water at top of tank B | Solenoid state |
| --- | --- | --- |
| absent | absent | unchanged |
| absent | present | activated |
| present | absent | released |
| present | present | released |

One characteristic of the logic shown in Table 2 is that after the system is fully primed, the magic switching valves will activate again as soon as enough air enters the system (e.g., from bubbles or leaks in the supply pipe) that the sensor at the top of tank A no longer senses the presence of water. In some embodiments, an additional sensor is disposed near the bottom of tank A. This sensor can be used to cause activation of the solenoids only when the level in tank A drops below this lower level. Effectively, it is used to detect priming, but allows tank A to gradually fill with air after priming until the water level falls below the lower sensor, thereby reducing the number of time that the solenoids are activated to respond to bubbles and leaks. The complete logic is shown in Table 3. States not listed cannot logically occur. For example, if there is water present at the top of tank A, then there is always water present at the bottom of tank A. If there is no water at the bottom of tank A, then there must be water present at the top of tank B.

TABLE 3

| Water at top of tank A | Water at bottom of tank A | Water at top of tank B | Solenoid state |
| --- | --- | --- | --- |
| absent | present | absent | unchanged |
| absent | absent | present | activated |
| absent | present | present | unchanged |
| present | present | absent | released |
| present | present | present | released |

The skilled artisan will recognize that there are other embodiments of level sensors and positions that can provide the same control functions. For example, sensors can be located near the bottoms of both tanks instead of the tops. Rather than detecting the arrival of water at the top of a tank connected to the delivery pipe to trigger a state change, one can detect the loss of water at the bottom of the tank connected to the supply pipe. The skilled artisan will recognize that a similar table of control logic can be made for sensors located near the tank bottoms.

Any suitable level sensing technology can be used. The presence sensors used in the above embodiments can be, for example, mechanical, electrical, optical, acoustic, ultrasonic or radar. Sensors which provide a digital or analog level indication can also be used, based on, for example, mechanical, electrical, optical, acoustic, ultrasonic or radar measurement techniques. Pressure sensors can be used as level sensors. The skilled artisan will recognize that the control logic can vary to exploit particular measurement technologies. For example, a pressure sensor at the bottom of a tank can be used to indicate tank fluid level based on the head of liquid. In this way, one sensor can replace the functionality of both an upper level and a lower level sensor.

In some embodiments, to reduce energy use further, the magic pipe switcher can have a holding pin. When the solenoid is activated, a pin is pushed by a spring such that the pin holds the valves in position, the power to the solenoid can be removed, and no electricity is required to hold the solenoid in position. When the control system decides that the solenoid should be releases, a signal is sent to a separate small pin actuator to pull the pin out so that the main solenoid spring can return the solenoid to the released position. The pin actuator only needs to be activated for a brief time interval sufficient to pull the pin. To reduce the power required for the pin actuator, the main solenoid K can be reactivated briefly to relieve the spring force on the pin, so that very little force is required to pull the pin.

In some embodiments, a bistable valve actuator can be used instead of a solenoid opposed by a spring. In these embodiments, both the "activated" and "released" states are inherently stable positions, and power must be applied only to move the actuator from one state to the other.

In any embodiments not requiring power to hold one position of the magic pipe switcher, the control system need not return the actuator to the released state when the pump is fully primed.

In some embodiments, the magic pipe switcher N can be activated by hand. A user can close and open the valves manually via a handle. These embodiments can be cheaper, and may be adequate for applications where there is only a need to use the magic pipe switcher briefly on startup, and the supply of water is continuous once the pump is primed.

In some embodiments, the two magic pipe switchers can be integrated as one unit having eight input/output pipes and eight valves operated by a single actuator of any of the types described above. The magic pipe switcher can be made in many different forms and in numerous versions. For example, the magic pipe switcher can be made as four valves, each having its own actuator, where the electronic controls provide the correct sequencing.

In some embodiments, a magic pipe switcher is integrated into a single cylindrical device. A sliding cylinder can have two cross holes. One end of each of the cross holes connects to channels in the walls which are always connected to ports G and H respectively. The other end would have channels that reverse the connection as the cylinder move between two operating positions. For example, the two cross holes could be both displaced vertically and rotated at an angle with respect to each other. One channel could then be horizontal, while the other has a longer path around the horizontal channel. The net functionality is essentially similar to an electrical double-pole-double-throw switch used to reverse electrical connections. In some embodiments, two of these integrated magic pipe switchers can be integrated into a single cylinder with a single actuating mechanism.

In some embodiments, the two tanks A and B, the centrifugal pump, and the two magic pipe switchers can be integrated all together in one box to make one compact system with only two fluid connections, one for pumping and the other for suction.

In some embodiments, the tanks A and B further comprise one-way check valves at the top and bottom of the tanks. The tank connected to the outlet of the pump will generally contain higher pressure than the tank connected to the inlet, and it can be advantageous to prevent backflow from the delivery pipe Y and into the supply pipe X when the roles of the tanks are switched by the magic pipe switcher. The check valves ensure that flow is only possible out of the supply pipe and into the delivery pipe. Building codes may require such check valves to protect a water supply from back contamination. The check valves also ensure that no progress is lost in the net flow of water from the supply pipe to the delivery pipe during tank switching events. After switching, excess pressure in the tank newly connected to the pump inlet is relieved by forcing fluid through the pump to the tank newly connected to the pump outlet. The pump then continues to decrease the pressure in the tank on the supply side and increase the pressure in the tank on the outlet side until the pressures are such that all check valves are open and pumping out of the supply pipe and into the delivery pipe can resume.

EXAMPLES

Embodiments of self-priming pumps have been described above in the context of water pumps, generally, where the source of water is located no more than about 10 m below the pump location. Such pumps can be used for any general-purpose water pumping application including but not limited to drinking water supply, sump pumps, draining of flooded spaces, firefighting, swimming pool draining and filling, industrial water supply, sanitary water supply, irrigation, and so on. Other applications are also possible as exemplified below.

Example 1

Gas Compressor

Figure 12:
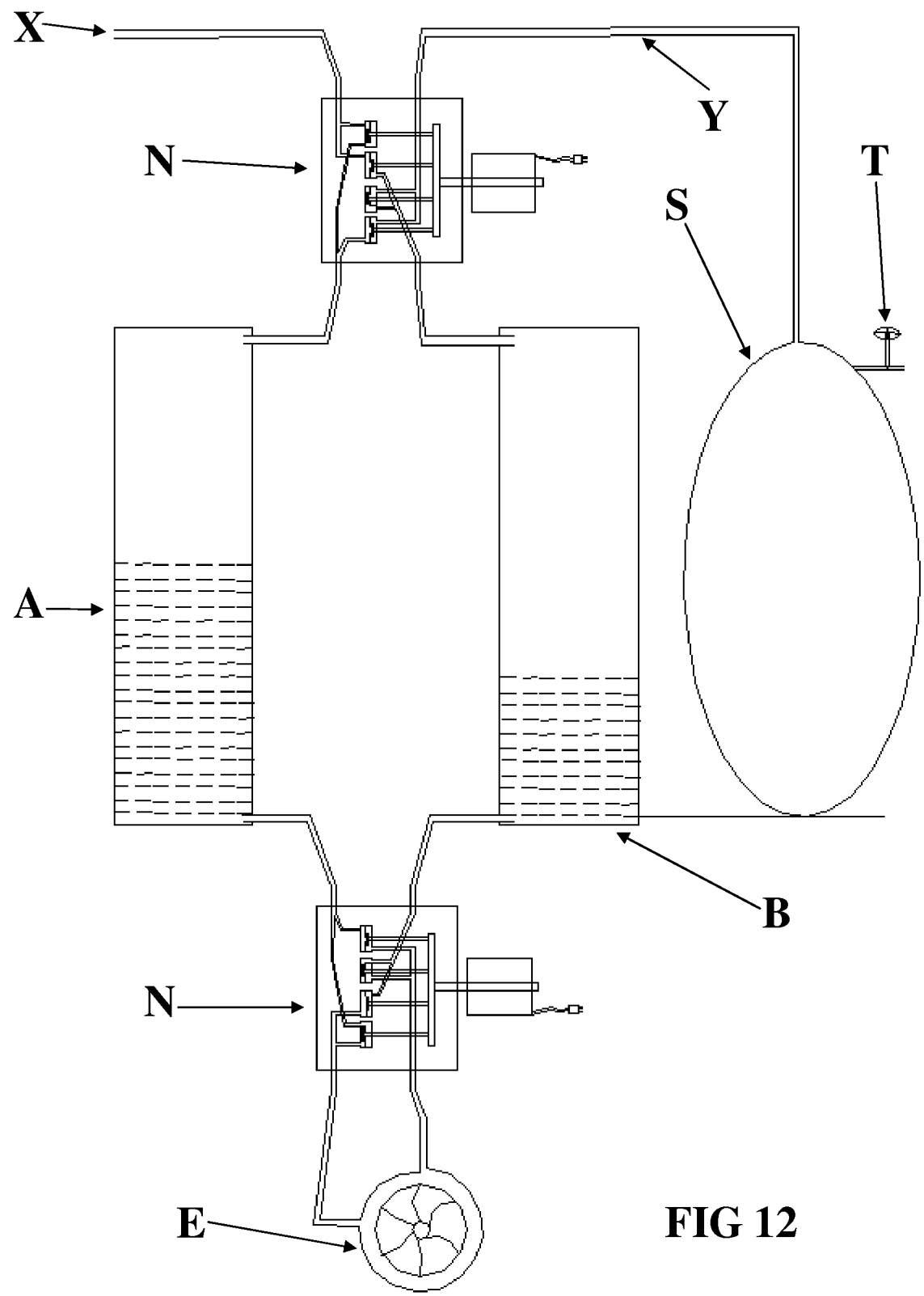
FIG. 12 shows a pumping system used to compress gas into a storage tank.

In some embodiments, the pump can be used to compress a gas. FIG. 12 shows a tank S for storage of compressed air or gas. The tank S is connected to the delivery pipe Y. A pump liquid is cycled between tank A and tank B in order to raise the pressure of successive volumes of gas and pump these volumes into the delivery pipe Y and tank S. Check valves are used to ensure that no backflow occurs as tanks A and B are swapped. A pressure switch on tank S can be used to turn the pump off when a desired pressure is reached and to turn the pump back on when the pressure drops below a lower set point.

The liquid pumping fluid is repeatedly cycled between tanks A and B, and the self-priming ability of the pump is used to effectively pump the gas to compress it on each cycle. The liquid can be selected to resist high temperature and freezing. An antifreeze solution (e.g., a solution of ethylene glycol) or a hydrocarbon or silicone oil can be used.

The fluid volume is chosen so that one of the tanks is full of liquid and the other one is partly empty at the start of a cycle. Pumping proceeds as usual until the liquid reaches the top of the tank connected to pump output, and substantially all of the gas has been pushed out of the tank. The controller receives a signal from a sensor, the state of the magic pipe switchers is changed, and the direction of the pumping is effectively changed so that the pump output is connected to the empty tank, and the pump input is connected to the full tank. Gas is always sucked from the supply pipe X and pushed into the delivery pipe Y. Check valves ensure that there is never any backflow.

Centrifugal pumps generate pressure by rapid rotation of a volume of fluid to develop a pressure increase from the center of rotation to the periphery. The pump inlet is directed near the axis of rotation and the pump outlet is on the periphery. Gas compression applications often require high pressures. Typical compressed gas storage tanks store gas at 2000-3000 psi and more. In general, it is possible to increase the pressure difference between the inlet and outlet of a centrifugal pump either by increasing the angular speed of rotation of the pump or by increasing the diameter of the impeller or both. Most centrifugal pumps are, however, limited as to how much pressure increase can be practically achieved. Excessive speed at the outer edge of an impeller can result in cavitation in the fluid which can both reduce pump efficiency and damage the impeller surface. Higher pressures can be achieved by connecting a set of centrifugal pumps in series. Optionally, the set of pumps can be driven on a common shaft by a common drive motor, and the fluid connections can be made integral to a common housing. Multistage pumps of this type are available commercially, for example, from Dickow Pump Co. (Marietta, Ga.) and V-Flo Group (Shenyang, China). Output pressures of at least 3800 psi are available. Multistage pumps can be used in embodiments of the present invention.

Example 2

Deep Water Wells

Figure 14:
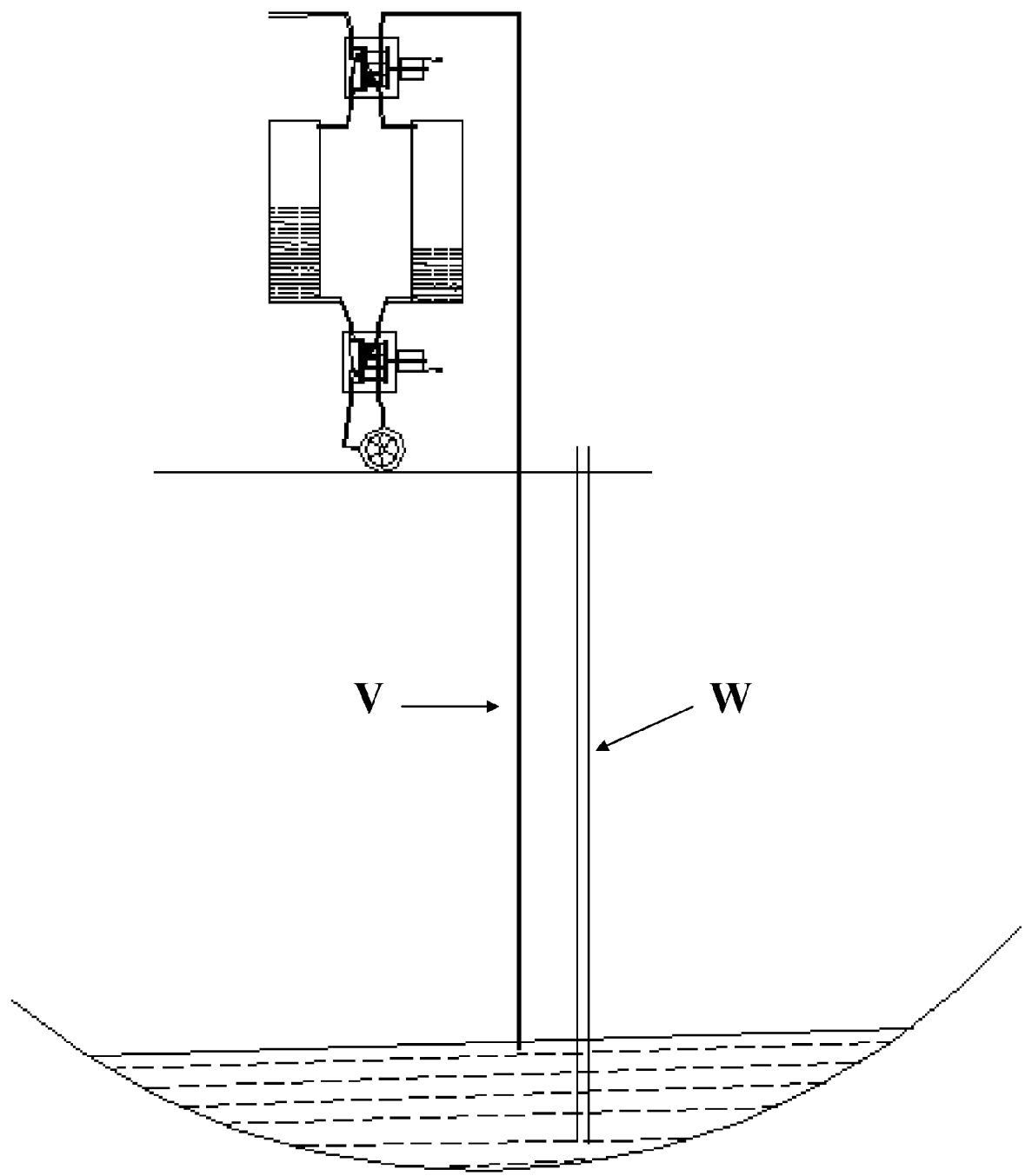
FIG. 14 shows a pumping system used to drive compressed gas into an underground reservoir to drive water to the surface.

In some embodiments a self-priming pump can be used to pump water from great depths without using a submersible pump at the bottom of the well. The pump is used to pump a gas in a manner similar to that of Example 1. The arrangement is shown in FIG. 14. The pump system is located at the earth surface, and the delivery pipe is connected to a pipe V extending down to the water reservoir. A well pipe W provides a path for the water to rise to the surface. As long as the water reservoir is contained in a closed region that can be pressurized, the pump can be used to raise the pressure in the closed region to drive water up a well pipe whose inlet is positioned below the water surface. High pressures may be required, but since all pressures are above atmospheric, there is no limitation on depth from which water can be pumped.

Example 3

Carbon Sequestration

In some embodiments a self-priming pump can be used to pump $CO_2$ into underground reservoirs. The pump is used to pump $CO_2$ in a manner similar to that of Examples 1 and 2. Geological formations with enormous capacities exist that can be safely used to sequester extremely large volumes of gas.

Example 4

Cooling System

Figure 10:
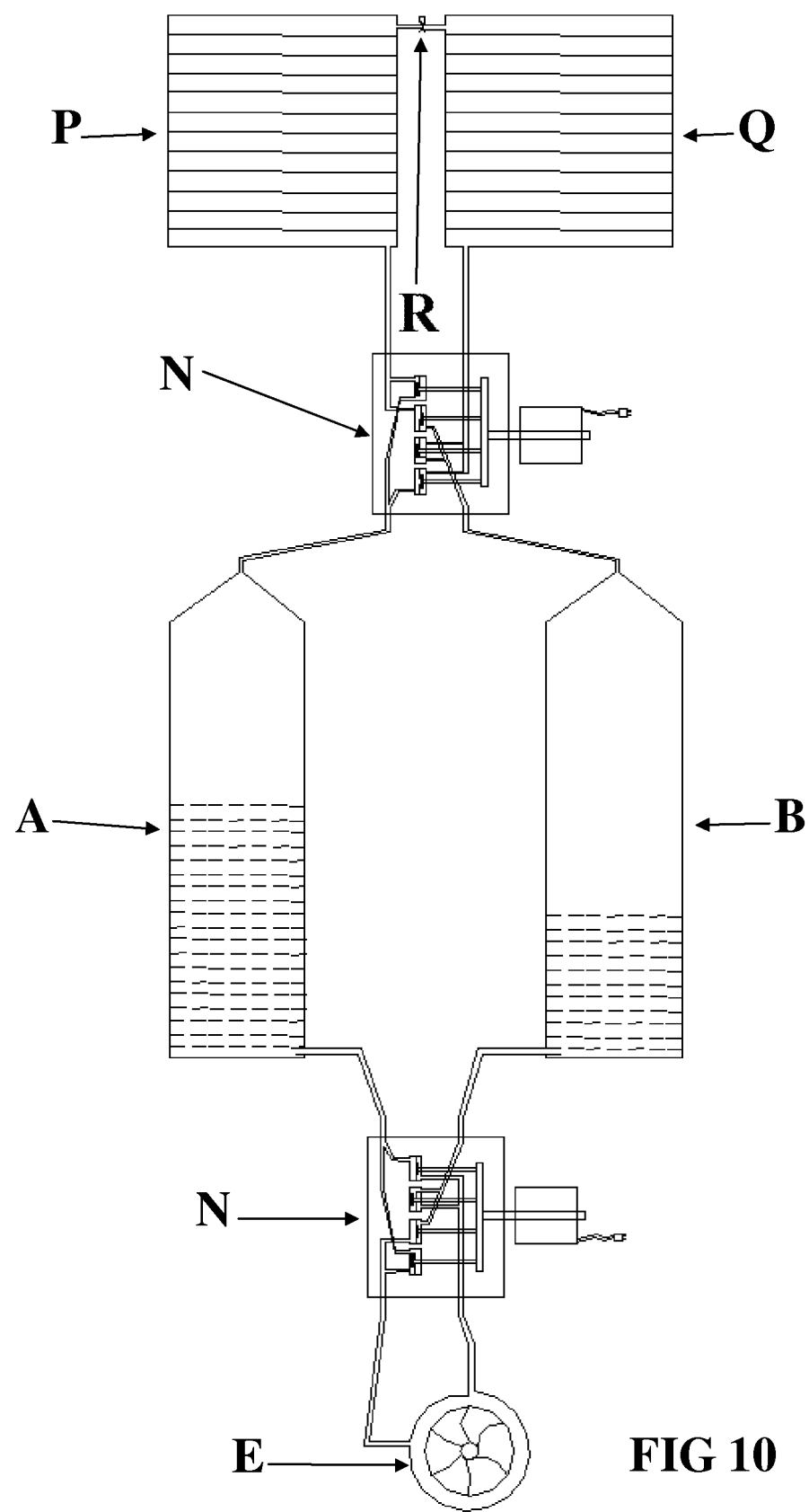
FIG. 10 shows a pumping system used as part of a cooling system with an evaporator and a condenser.

In some embodiments a self-priming pump can be used to operate a refrigeration or cooling system as shown in FIG. 10. The pump configuration is the same as that shown in FIG. 9 except that the evaporator P of the cooling system is connected through the supply pipe to port G of the upper magic pipe switcher N and the condenser Q of the cooling system is connected through the delivery pipe to port H of the upper magic pipe switcher. A fine tube or evaporation control valve R is located between the condenser and the coils of the evaporator. The pump is used to pump a gas in a manner similar to that of Example 1, except that the gas to be compressed is a refrigerant gas such as ammonia or FREON®.

In some embodiments of cooling and refrigeration systems, tanks A and tank B are tapered at the top, so that all gas in the tank connected to condenser Q is pushed out of the tank when the liquid reached the top of the tank, thereby maximizing overall efficiency of the system.

Figure 11:
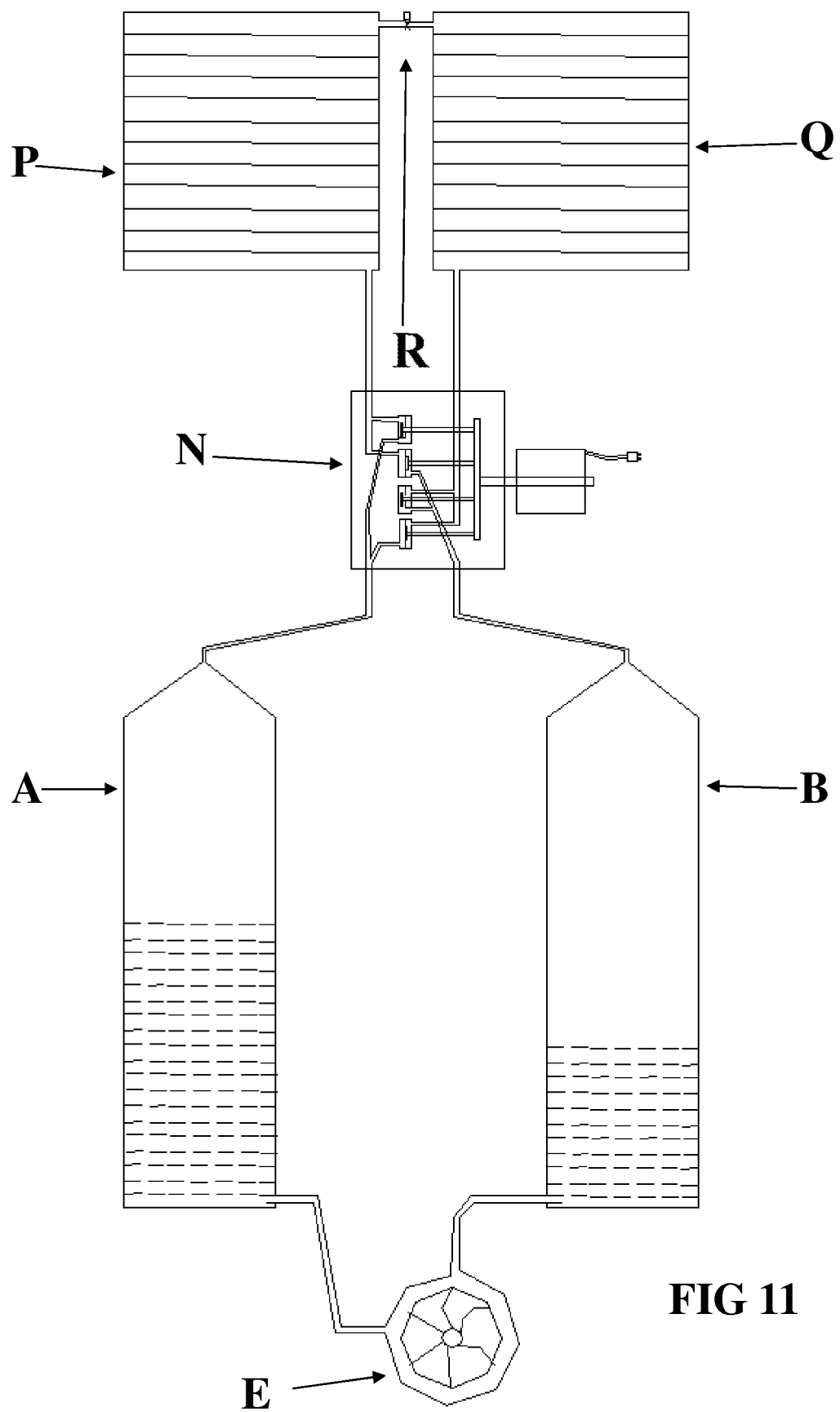
FIG. 11 shows a cooling system with a reversible pump and a single magic pipe switcher.

In some embodiments, a pump E having reversible pumping direction can be used. With a reversible pump, the configuration of FIG. 11 can be used with a magic pipe switcher N only at the top of tanks A and B. The control system can then switch the pumping direction at the same time that the magic pipe switcher state is changed.

Cooling systems according to these embodiments are especially advantageous for large systems such as those used in ships, warehouses, large buildings and the like where efficiency, energy savings, reduced maintenance costs, and ease of maintenance are particularly important, but the methods can be beneficially applied for cooling systems of any size.

Figure 13:
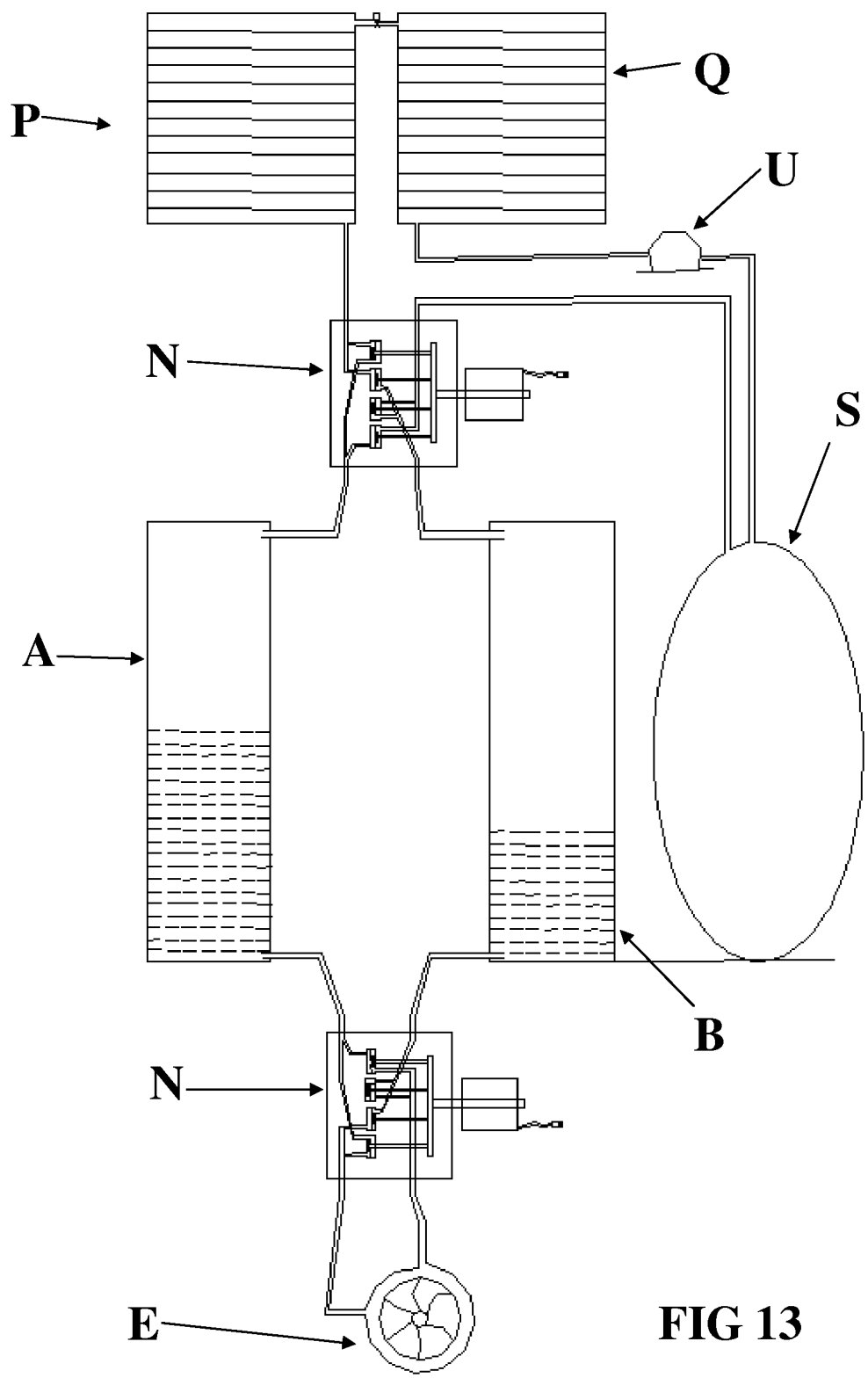
FIG. 13 shows a cooling system with an auxiliary gas storage tank.

In some embodiments, the cooling system can have a tank S for storing compressed gas connected to the delivery pipe as shown in FIG. 13. An additional small compressor U can further compress the gas and pump it into the condenser Q. A check valve can be placed at the inlet to tank S to prevent backflow to the main pump.

This combination can enable a small secondary compressor to operate a large cooling system from an already compressed gas with cost and energy savings.

Example 5

Extracting Oil from Depleted Oil Fields

Abandoned or depleted oil fields can contain enormous amount of oil as semi-solid rock or thick oil sludge, hundreds of meters below the surface. To lift this type of oil from such wells, it must be converted it into a runny liquid by heating and then the pressure above the reservoir of oil must be increased to drive the oil to the surface. Heat can be provided by underground combustion. Oxygen (or air) can be pumped into the underground reservoir. If there is sufficient volatile combustible material in the reservoir supplying oxygen can be sufficient to start combustion and the resulting heat and pressure can drive oil to the surface. In some reservoirs the residual oil may not readily combust, and additional fuel must be supplied, at least until sufficient heat is generated to vaporize some hydrocarbon fuel.

Figure 15:
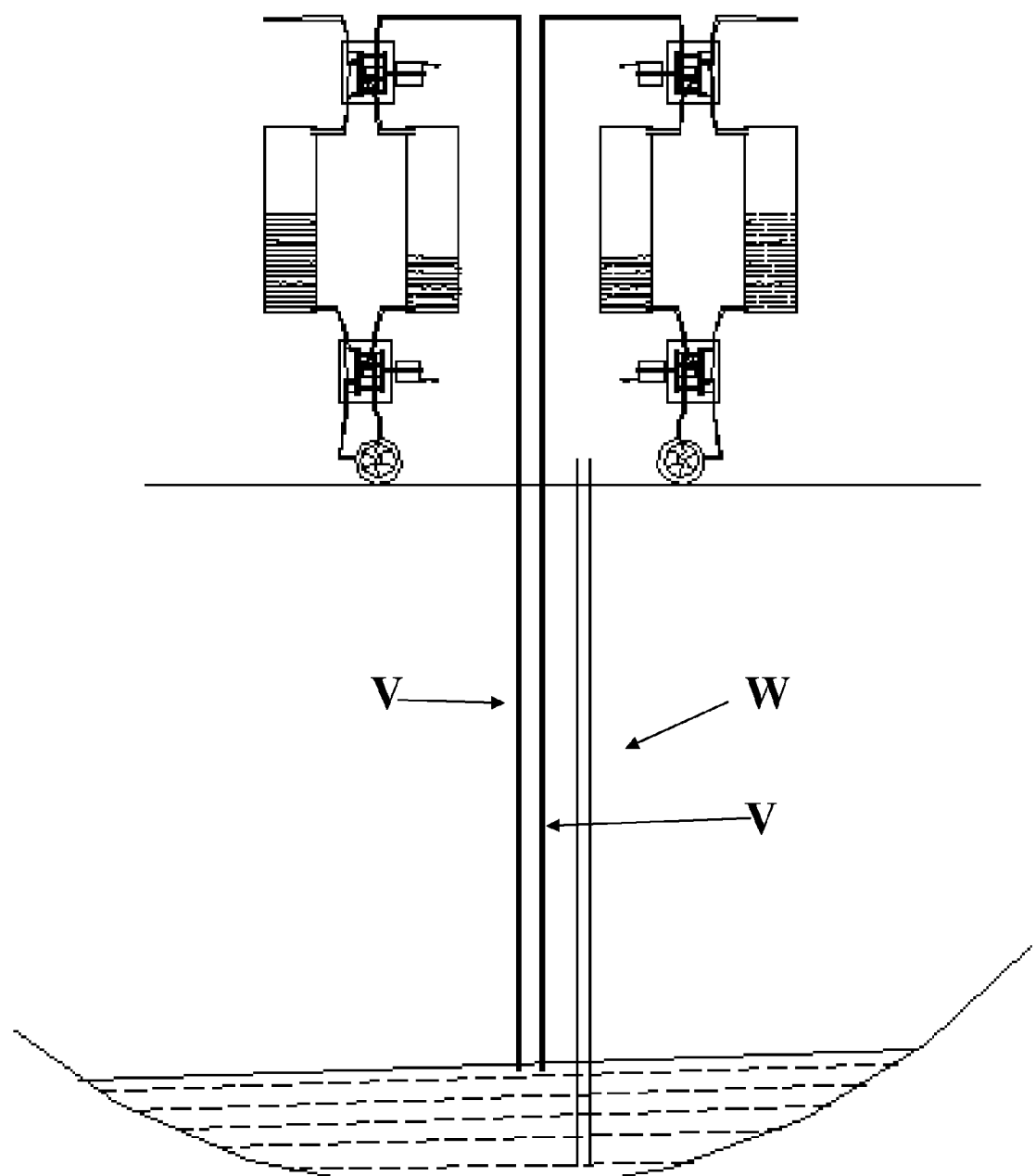
FIG. 15 shows two pumping systems being used to pump oxygen and a combustible gas or liquid into an underground oil reservoir to heat the oil and drive it to the surface.

FIG. 15 shows an exemplary embodiment using two pumps equipped with tanks and magic pipe switchers. One pump is used to pump oxygen using the methods given in Example 1 deep into an abandoned or depleted oil reservoir. A second pump is used to pump a gas or liquid capable of reacting with oxygen to make a combustion reaction. The combustion reaction, deep inside the oil well, can generate super-heated gas and a tremendous rise of pressure inside the oil well. The heat can melt the semi-solid oil and converts it into a lower viscosity liquid, and the massive pressure can push the oil up the oil well pipe.

Any combustible gas can be used. In some embodiments a gas or liquid such as a hydrocarbon gas is selected which has gaseous products of combustion (e.g., $CO_2$) to help increase the pressure in the oil field.

Initially, the flow of oil to the surface may be small, but as pressure builds inside the oil well, the recovery rate can increase substantially; it is estimated that about 7-10 barrels of oil can be recovered for every barrel-equivalent used to fuel the underground combustion. The useful life and total extractable oil from old oil fields can be extended dramatically by these methods.

Pumping oxygen or air into an oil reservoir and then starting combustion is a very good method for extraction of oil from abandoned oil reservoir. However, in some embodiments, any available gas such as $CO_2$ or $N_2$ or a gas mixture can be used without initiating combustion to pressurize an oil reservoir and push oil to the surface through a well pipe.

In some embodiments, the reactants necessary for combustion are all pumped into the oil reservoir from the surface. Such reactants can be two or more gases, a mixture of one or more gases and one or more liquids, or a mixture comprising gases and/or liquids with powders. Any suitable mixture can be used that can be ignited in the reservoir to generate heat and pressure in the oil reservoir.

In an oil reservoir with a plurality of abandoned oil wells, some wells can be used to pump oxygen into the reservoir and other wells can be used to extract the oil. No new wells are required—only a few pumping systems.

Example 6

Gas Liquification

Figure 16:
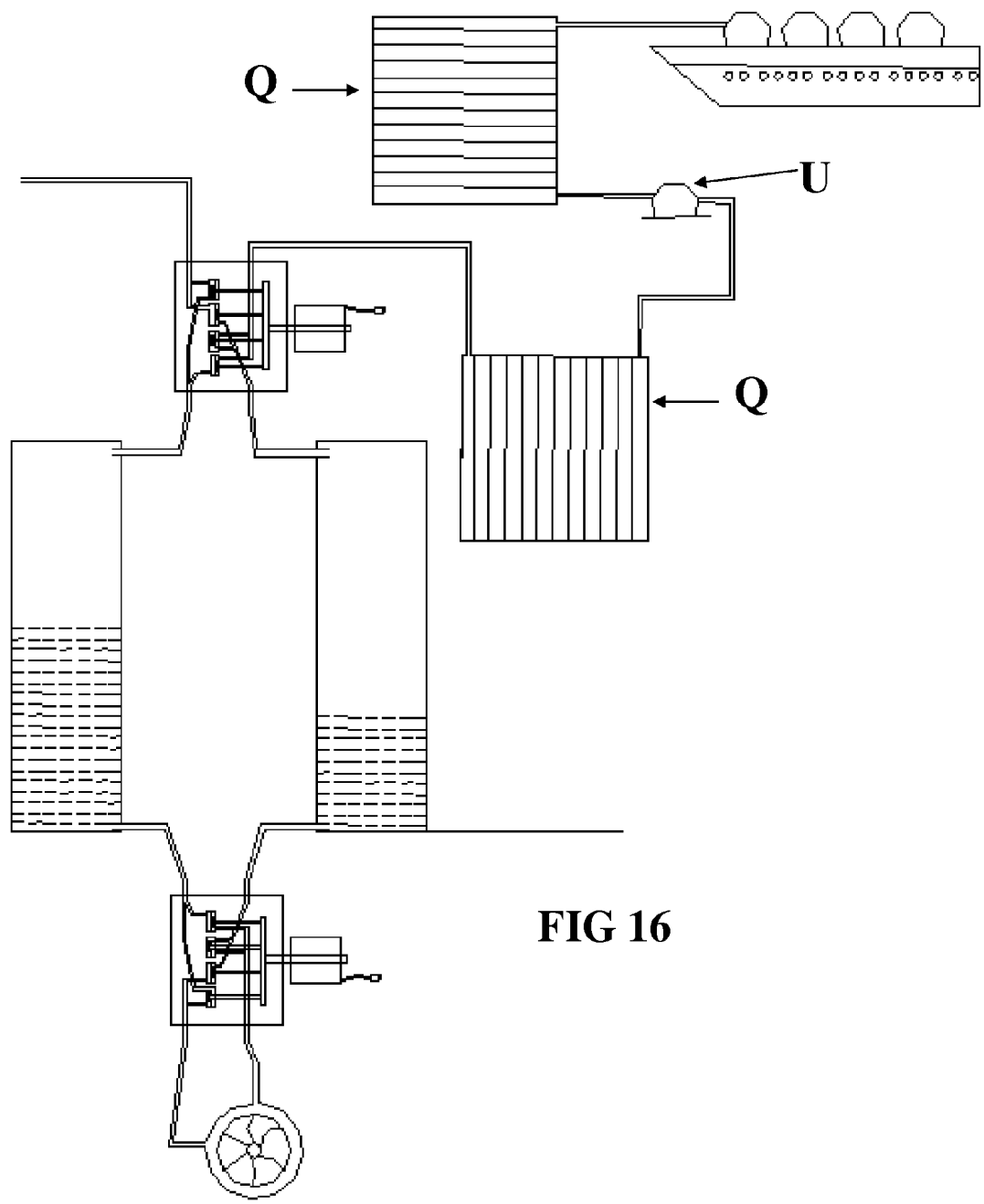
FIG. 16 shows a two-stage gas liquification system using two pumps and two condensers.
Figure 17:
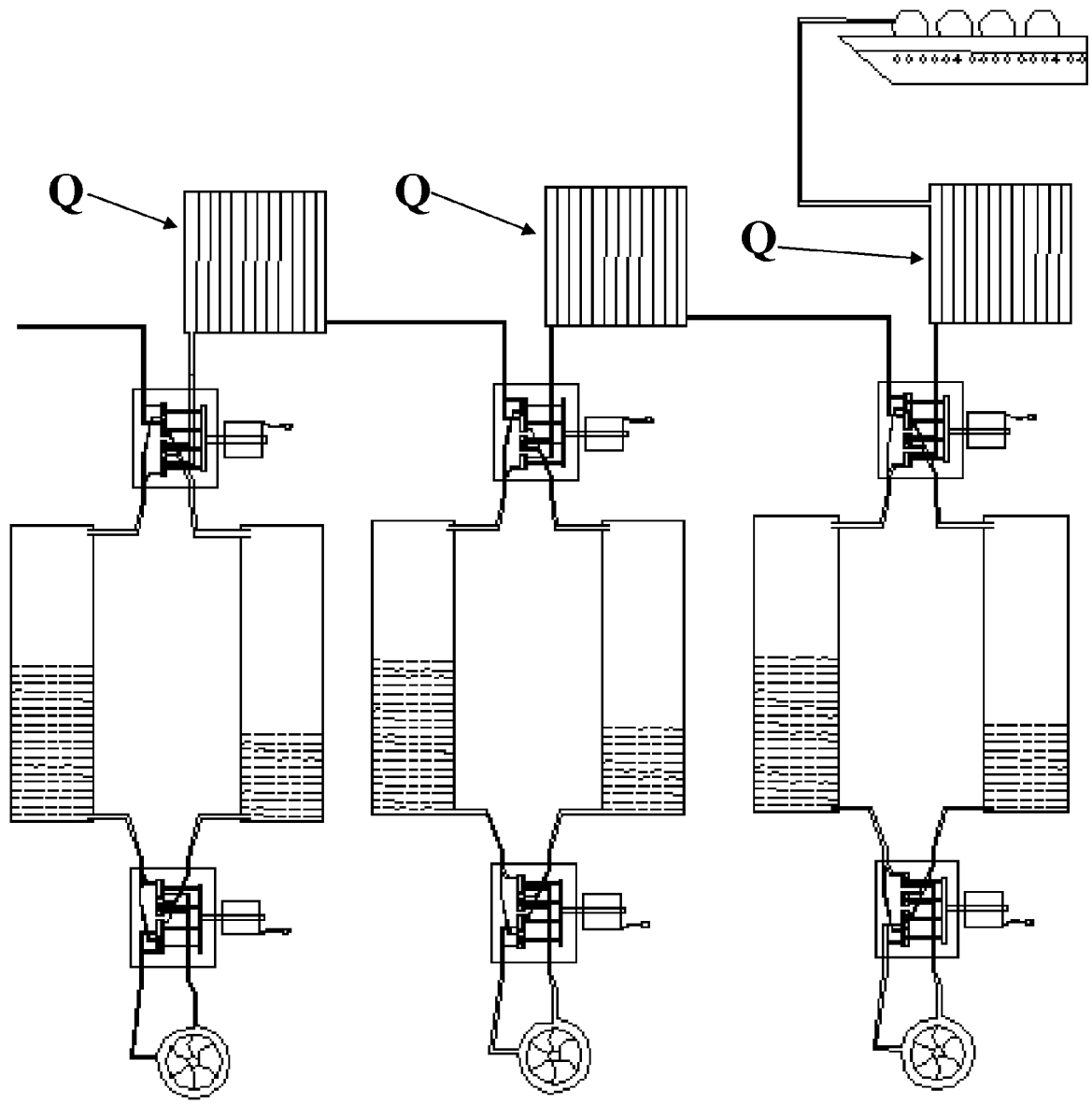
FIG. 17 shows a three-stage gas liquification system.

Gas liquification can be accomplished by multi-stage compression and cooling. For example, fuel gases such as methane are typically liquefied for storage and transport by railroad or truck tanker or by ship. FIG. 16 shows a two-stage compression system with two condensers Q and two pumps. In FIG. 16, the second pump U is shown as a small auxiliary pump such as a piston pump, although it can also be another pump of the type described in Example 1. The liquefied gas is being shown loaded onto a ship. FIG. 17 shows a three-stage gas liquification system using three pumps of the type described in Example 1, together with three condensers.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A pumping system comprising
a supply pipe;
a delivery pipe;
a pump capable of pumping a liquid;
a first tank with a first pipe connected to the first tank at the upper end of the first tank and a second pipe connected to the first tank at the lower end of the first tank;
a second tank with a third pipe connected to the second tank at the upper end of the second tank and a fourth pipe connected to the second tank at the lower end of the second tank;
a first pipe switcher operable to switch connections between a first state and a second state, wherein the first state comprises a connection between the supply pipe and the first pipe and a connection between the delivery pipe and the third pipe, and wherein the second state comprises a connection between the supply pipe and the third pipe and a connection between the delivery pipe and the first pipe; and
a second pipe switcher operable to switch connections between a first state and a second state, wherein the first state comprises a connection between the second pipe and the pump inlet and a connection between the fourth pipe and the pump outlet, and wherein the second state comprises a connection between the second pipe and the pump outlet and a connection between the fourth pipe and the pump inlet;
wherein the first state of the first pipe switcher is contemporaneous with the first state of the second pipe switcher, and the second state of the first pipe switcher is contemporaneous with the second state of the second pipe switcher.

2. The pumping system of claim 1, wherein the first and second pipe switchers each comprise two normally open valves and two normally closed valves connected to a common actuator.

3. The pumping system of claim 2, wherein said common actuator comprises a solenoid and spring.

4. The pumping system of claim 1, wherein the first and second pipe switchers each comprise a unitary valve body with four ports.

5. The pumping system of claim 4, wherein the first and second pipe switchers are combined as a single unitary body with a common actuator.

6. The pumping system of claim 1, further comprising sufficient liquid to fill the pump and the second pipe switcher and to substantially fill one of the two tanks.

7. The pumping system of claim 1, further comprising at least one level sensor in each tank.

8. The pumping system of claim 7, wherein a control system monitors the level sensors and changes the state of the switching valves such that the pump is always substantially full of fluid, even if the supply pipe is empty of fluid.

9. A cooling system comprising the pumping system of claim 1, and further comprising an evaporator and a condenser, wherein said supply pipe is connected to the output of the evaporator, and said delivery pipe is connected to the input of the condenser.

10. A gas compression system comprising the pumping system of claim 1, wherein the supply pipe is connected to the source of gas to be compressed, and the delivery pipe provides compressed gas for use or storage.

11. A system for pumping water from an underground reservoir comprising the gas compression system of claim 10, wherein the delivery pipe is connected to a first well pipe going down into the underground reservoir and the water is pushed up through a second well pipe to the surface.

12. A system for extracting oil comprising the gas compression system of claim 10, wherein the gas compression system is used to pump a gas comprising oxygen into an oil reservoir, and underground combustion is used to drive heated oil to the surface.

13. The system of claim 12, further comprising a second pumping system used to pump combustible fuel into the oil reservoir.

14. A method for pumping water from an underground reservoir comprising pumping a gas through a first well pipe into the underground reservoir using the pumping system of claim 1, and pushing water up through a second well pipe to the surface.

15. A method of liquefying a gas comprising compressing the gas using the pumping system of claim 1, cooling the gas in a condenser, and repeating the compressing and cooling using additional pumping systems and condensers until the gas in liquefied.

* * * * *